F. MÜLLER.
METHOD OF MAKING MILLING CUTTERS.
APPLICATION FILED JULY 29, 1920. RENEWED JULY 19, 1922.
1,429,616.
Patented Sept. 19, 1922.
2 SHEETS—SHEET 1.
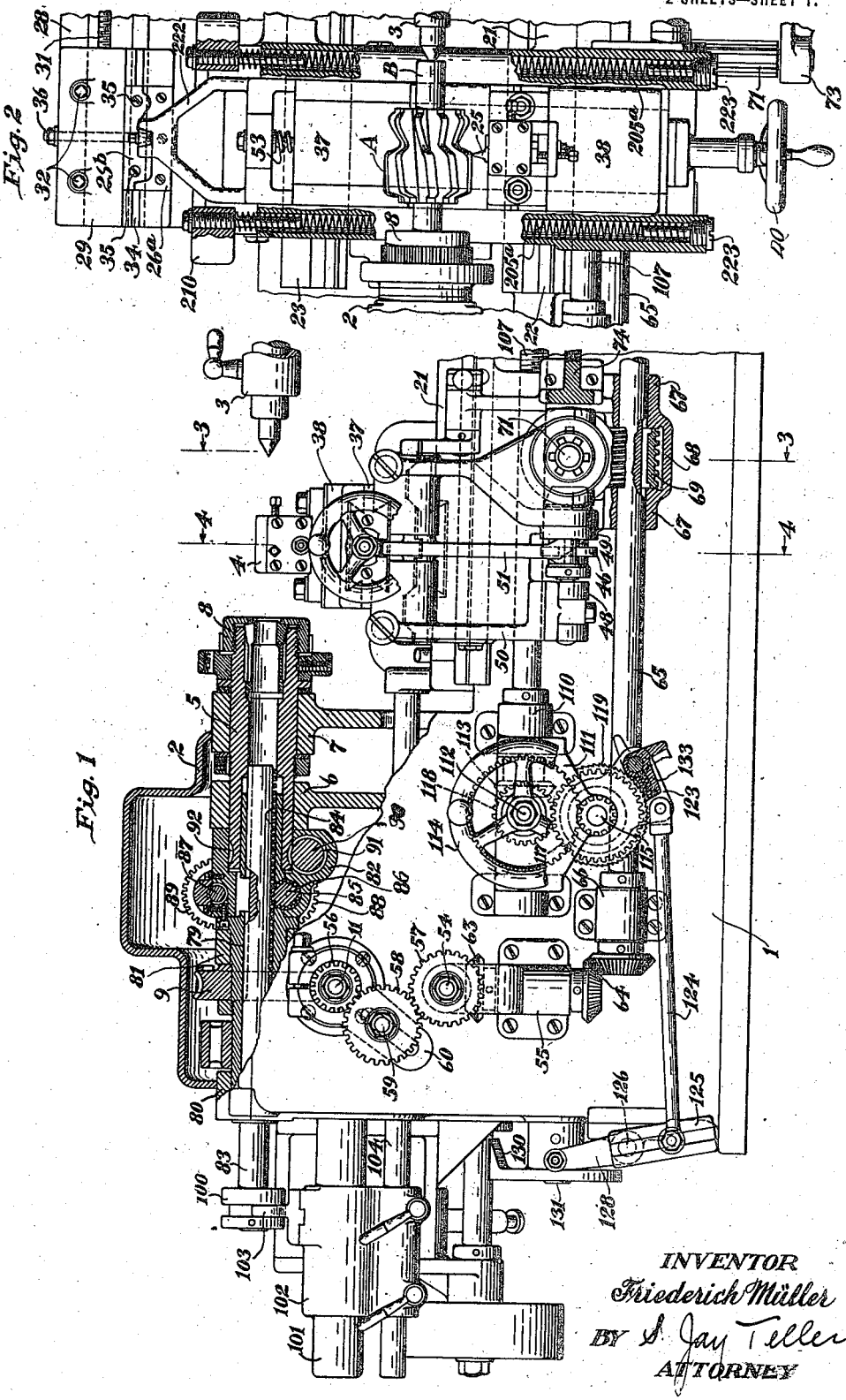
INVENTOR
Friederich Müller
BY S. Jay Teller
ATTORNEY F. MÜLLER.
METHOD OF MAKING MILLING CUTTERS.
APPLICATION FILED JULY 29, 1920. RENEWED JULY 19, 1922.

1,429,616.

Patented Sept. 19, 1922.
2 SHEETS—SHEET 2.

INVENTOR
Friederich Müller
BY S. Jay Teller
ATTORNEY

Patented Sept. 19, 1922.

1,429,616

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METHOD OF MAKING MILLING CUTTERS.

Original application filed March 31, 1919, Serial No. 286,524. Divided and this application filed July 29, 1920, Serial No. 399,717. Renewed July 19, 1922. Serial No. 576,149.

*To all whom it may concern:*

Be it known that I, FRIEDERICH MÜLLER, a citizen of the United States, residing at Hartford, in the county of Hartford and State of Connecticut, have invented certain new and useful Improvements in Methods of Making Milling Cutters, of which the following is a specification.

In practising the method involving the invention use is preferably made of a machine which is in some respects similar to that shown in my copending application for metal cutting machines, Serial No. 286,524, filed March 31, 1919. This present application is a division of the said application. The specific machine herein illustrated is set forth and claimed in my copending application for metal cutting machines, Serial No. 399,716, filed on even date herewith.

A machine of the type disclosed in the said applications is adapted to form and preferably relieve a milling cutter or other similar object, and, considered more specifically, a machine of this type is adapted to accurately relieve a cutter blank and provide it with a contour which conforms exactly to the contour of a predetermined former which is inserted in the machine.

Under most circumstances the former which is provided has a contour which is exactly the same as the contour of the milling cutter. Occasionally, however, it is preferable or more convenient to provide a former having a contour which is the reverse of the contour desired on the milling cutter. For instance, it may be desirable to utilize as a former a sample of the work which the milling cutter is intended to cut. When a former of reverse shape is provided it is necessary to utilize a machine which is somewhat different from the preferred form of machine as shown and described in the said application.

The principal object of the present invention, therefore, is to provide a method by means of which a milling cutter can be relieved and shaped in accordance with a cutter having a contour of reverse shape. A further object of the invention is to provide a method which includes a step-by-step feed of the former pin and cutting tool, the grooves in the cutter blank being utilized to permit the movement of the tool inward (instead of outward) at the time of each longitudinal feeding movement. Other objects of the invention will be apparent from the following specification and claims.

In the accompanying drawings I have shown the essential features of a machine adapted for use in practising the invention. Many of the details, however, have been omitted as these are or may be the same as shown in my aforesaid copending application Serial No. 286,524 and are not necessary for a full understanding of the method.

Of the drawings:

Figure 1 is a fragmentary combined elevational and sectional view of the machine.

Fig. 2 is a fragmentary plan view of the machine.

Figure 3:
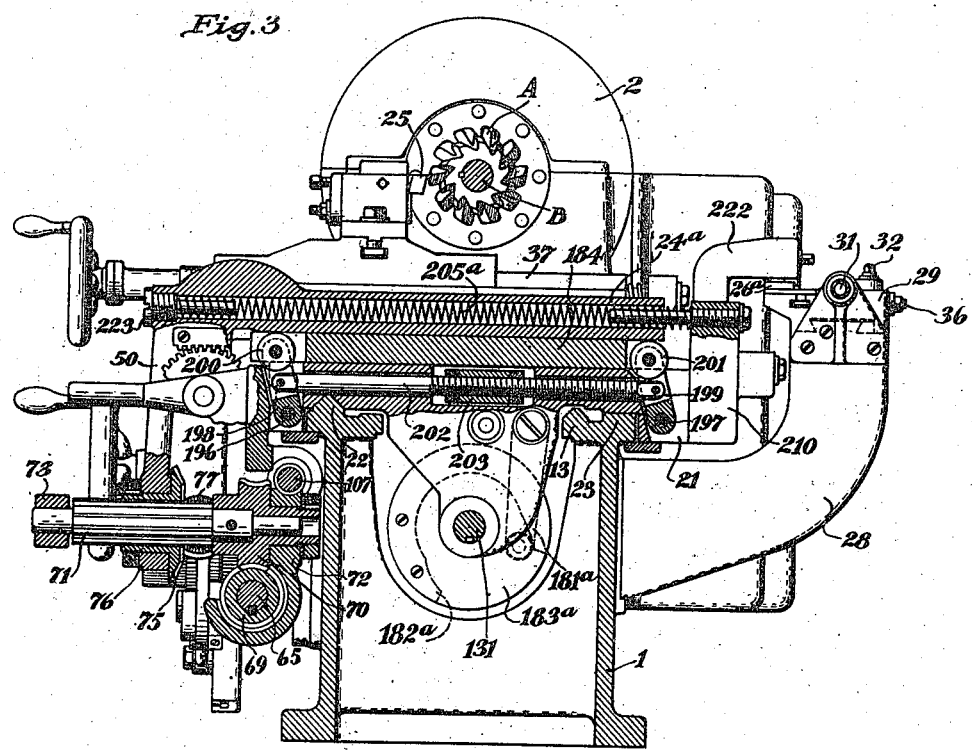
Fig. 3 is a sectional view of the machine taken along the line 3—3 of Fig. 1.

Referring to the drawings, 1 represents the main frame or bed upon which the other parts of the machine are mounted. For carrying the blank for the tool to be formed and relieved, there is provided a headstock 2 and preferably also a tailstock 3. A tool holding-end-operating mechanism is provided, as shown at 4. Preferably the headstock 2 and the tailstock 3 are so arranged as to hold the blank against longitudinal movement, the tool mechanism 4 being moved longitudinally along the blank in the manner to be presently set forth. When the machine is so constructed, the headstock 2 is fixedly secured to the bed, preferably being formed in part integrally therewith, as shown. The tailstock 3 is adjustable along the bed to accommodate blanks or blank arbors of different lengths.

The headstock 2 is provided with a rotatable spindle 5 mounted in bearings 6 and 7. Secured to the spindle is a collet chuck 8 which may be of any usual or preferred form and which is adapted to grip either the shank of the tool to be formed and relieved or an arbor upon which the tool is mounted. As illustrated in Fig. 2, there is a blank A mounted upon an armor B, the arbor being engaged by the shuck 8. For rotating the spindle 5 there is provided a worm wheel 9 meshing with a worm on a transverse rotatable shaft 11.

The tool mechanism 4 includes a carriage 21 which is longitudinally movable along ways 22 and 23 on the bed 1. Mounted for transverse movement with respect to the carriage 21 is a slide 24ª, this slide carrying the cutting tool 25. The tool 25 is preferably very narrow, but if desired a wider tool can be used in certain conditions.

A former and former pin are provided for controlling or guiding the tool so as to cause it to cut the blank with a predetermined contour. As illustrated, there is provided a former 26ª carried by the bed, this former having a shape which is the reverse of the shape desired to be cut on the blank A. The cutting tool 25 engages the blank at the front thereof, and, this being the case, the former 26ª is so arranged that the effective side thereof faces rearward, this rearward side being engaged by a former pin 27ª. The former pin is secured to the slide 24ª by means of a bracket 222. When the cutting tool 25 is symmetrical, as shown, the former pin 27ª is also symmetrical and has the same size and shape as the tool. The former pin is detachably secured to the slide so that it can be removed and another pin substituted corresponding to a tool differing in size or shape from the tool 25 which is shown.

For supporting the former 26ª there is provided a bracket 28 rigidly secured to the bed 1. In order to permit adjustment, the former 26ª is secured to a slide 29 which is longitudinally movable along a suitable guideway 30 on the bracket, a screw 31 being provided for effecting longitudinal movement. The slide can be locked in adjusted position by means of screws 32, 32 engaging a gib 33. As illustrated, the former 26ª is secured to a plate 26ᵇ and in order to permit the ready attachment of the former, the slide 29 is provided with a T-slot 34 adapted to receive T-bolts 35 passing through the former. To further assist in holding the former in place and to prevent any possible free movement thereof, there is provided a hooked bolt 36 which, when tightened, serves to draw the plate 26ᵇ back against a suitable shoulder on the slide.

The machine may be and preferable is provided with means for effecting relieving movements of the tool. It is to be understood that the invention is applicable either to a machine having suitable relieving mechanism or to one without such mechanism. The novel features of the machine embodying the invention have a peculiar cooperative relationship with the relieving mechanism when that is provided.

As illustrated, the tool is not rigidly secured to the slide 24ª but is transversely movable thereon. Mounted on the slide 24ª is a slide 37 which is transversely movable along a suitable guideway. Carried in part by the slide 24ª is a mechanism for effecting regular reciprocating relieving movements of the slide 37 and the tool in suitable timed relation with the rotative movement of the blank. In order that the tool may be adjusted for blanks of different sizes, there is provided a tool-carrying slide 38 transversely adjustable on the slide 37. It will be observed that with the construction described the tool is maintained in parallelism as it moves longitudinally for feeding or inward and outward to follow the contour.

The relieving mechanism for moving the slide 37 together with the tool 25 includes a rotatable relieving cam 46 which is mounted on the slide 24ª so as to be bodily movable therewith. As shown, the cam is mounted on a longitudinal rotatable shaft 47 mounted in bearings 48 and 49 on a bracket 50 depending at the front of the slide 24ª. A lever 51 is pivoted between its ends on the slide 24ª and at its lower end is provided with a roller engaging the cam 46. The upper end of the lever engages an abutment 52 on the slide 37. A coil spring 53 is interposed between the slide 37 and the slide 24ª, this spring tending to press the slide 37 forward, thus holding the abutment 52 in firm contact with the upper end of the lever 51. It will be seen that when the cam 46 is rotated the lever 51 will be oscillated, thus giving a reciprocating movement to the slide 37 and to the tool 25. The shape of the cam 46 is such that the slide 37 is moved forward relatively slowly at a uniform rate so that the tool may effect a relieving cut, and is then drawn back relatively rapidly so as to withdraw the tool and position it for another cut.

As before stated, the cam 46 is driven in timed relation with the blank rotation. For rotating the cam, I make use of the aforesaid transverse shaft 11. Positioned immediately below the shaft 11 is a shaft 54 which is mounted partly in the main frame and partly in a bracket 55 secured thereto. For connecting the two shafts 11 and 54 there is provided a gear 56 on the shaft 11, a gear 57 on the shaft 54 and an idler gear 58 meshing with the two gears 56 and 57. The idler gear is mounted on a bearing stud 59 carried by an adjustable slotted arm 60. The speed ratio between the two shafts 11 and 54 can be changed by removing one or both of the gears 56 and 57 and substituting other gears of different diameters, it being clear that the idler gear 58 can be adjusted to mesh with such differently diametered gears. Mounted in the said bracket 55 is a vertical shaft and this shaft is driven from the shaft 54 by means of bevel gearing 63. By means of bevel gearing 64 the shaft 62 serves to drive a longitudinal splined shaft 65. This shaft is supported partly in a bearing 66 secured to the bed and partly in bearings 67 in a depending bracket 68 secured to the carriage 21.

Mounted on the shaft 65 between the bearings 67 and splined to the shaft, is a worm 69. This worm meshes with a worm wheel 70 which is connected with a transverse shaft 71. The worm wheel and the shaft are rotatably mounted in a bearing 72 formed in the bracket 68, and in a bearing 73 formed on a supplemental bracket 74 secured to the bracket 68. Slidably mounted on the shaft 71 is a bevel gear 75, and this gear is engaged by a bearing 76 on the aforesaid bracket 50 depending from the front end of the slide 24ª. The bevel gear 75 meshes with a bevel gear 77 on the shaft 47. The bevel gear 77 and the shaft 71 are splined or otherwise suitably constructed so that the bevel gear is rotated, but is at the same time free to move transversely of the machine when the slide 24ª is moved. Inasmuch as the bevel gears 75 and 77 are both supported by the bracket 50, they are at all times held in mesh. It will be seen that with this construction power is transmitted from the shaft 11, through the several parts that have been described, to the shaft 65, and is transmitted from the shaft 65 to the shaft 47 and the cam 46, the connection between the shaft 65 and the shaft 47 being such that free transverse movement of the cam and associated parts is permitted. The cam 46 is given one complete rotation for each tooth of the blank.

In order that blanks with helical teeth may be properly formed and relieved, it is necessary to effect the relieving movements of the tool in peculiar relation to the rotative movement of the blank so that the relief may be in conformity with the helical teeth. I have stated that the relieving movements of the tool are effected in timed relation to the rotative movement of the blank; and, for any given position of the carriage, this timed relation is fixed and definite, but when the carriage is moved to bring the tool into a new cutting position, it is necessary to vary the relation between the relieving movements of the tool and the rotative movement of the blank.

In the construction illustrated, the worm 9 is not connected directly with the spindle 5 but is connected indirectly by means of suitable gearing which can be supplementally moved to change the spindle rotation. By preference, this gearing is bodily rotatable and includes a rack and pinion, the rack being longitudinally slidable in accordance with the longitudinal movements of the carriage 21. Coaxially mounted with the spindle 5 is a sleeve 79, this being supported in bearings 80 and 81 in the headstock. The inner end of the sleeve preferably extends into and has a bearing in the outer end of the spindle. The aforesaid worm 9 is rigidly secured to the sleeve 79. Associated with the spindle is a frame 82 which is recessed to receive the outer end of the spindle and engage the outer surface thereof. Slidably mounted in the sleeve 79 is a shaft 83 having rack teeth formed thereon at 84. The shaft 83 is splined to the sleeve 79 so as to be rotatable therewith. Rotatably mounted in bearings in the frame 82 is a transverse shaft 85 provided with teeth 86 which meshes with the rack teeth 84. Also rotatably mounted in the frame 82 is a transverse shaft 87. The two shafts 85 and 87 are connected by spur gears 88 and 89. Also rotatably mounted in the frame 82 is a third rotatable shaft 90, to which is secured a worm 91. This worm meshes with worm teeth 92 formed in the periphery of the spindle 5 near the end thereof. At the side of the bracket 82 opposite from the gears 88 and 89 there is provided gearing (not shown) for connecting the shafts 87 and 90.

Carried by the shaft 83 at the outer end thereof is an annularly grooved collar 100. Rigidly secured to the main frame adjacent the shaft 83 is a longitudinal guide stud 101. Slidably mounted on the stud 101 is a bracket 102 having a fork 103 entering the groove in the collar 100. The bracket 102 is apertured to receive a longitudinal rod 104 which is connected at its right-hand end with the carriage 21. The bracket 102 can be clamped to the rod 104 in any desired relative position.

It will be seen that when the carriage 21 is moved longitudinally along the bed the rod 104, together with the bracket 102, will be moved at the same time and to the same extent. By reason of the engagement of the fork 103 with the collar 100 the shaft 83 is similarly moved, thus moving the rack teeth 84. When the rack slides longitudinally the pinion 86 is turned and this serves, by means of the gearing and the several shafts that have been described, to turn the worm 91. The rotative movement of the form 91 serves to turn the spindle 5 relatively to the frame 82 and the sleeve 79. It will be understood, as before stated, that the entire gearing 78 rotates bodily with the sleeve 79. It will therefore be clear that the relative movement of the spindle with respect to the sleeve simply serves to either increase or decrease the spindle rotation to a certain extent. However, the relative movement of the spindle is determined by the longitudinal movement of the rack 84, which in turn is determined by the longitudinal movement of the carriage 21 and of the cutting tool 25 carried thereby. Inasmuch as the relieving cam reciprocates the tool with a frequency which is normally uniform, and inasmuch as the spindle and the blank are given a changed rotation which is in exact proportion to the longitudinal movement of the carriage and the tool, it is clear that the removing movements are effected in such relation to the blank as to be in conformity with helical teeth.

For moving the carriage longitudinally along the bed there is provided a screw 107 which engages a nut 108 carried by a bracket 109 depending from the carriage. The screw is supported at its left-hand end in a bearing 110 formed in a bracket 111 secured to the bed. Mounted in the bracket 111 is a transverse shaft 112 which is connected with the screw 107 by means of bevel gearing 113. At the front end of the shaft 112 is a hand wheel 114 by means of which the screw may be turned manually to move the carriage. In order that the carriage may be moved automatically to feed the tool from one cutting position to another, a suitable mechanism is provided. This mechanism is adapted to feed the carriage intermittently. Mounted in the bracket 111 is a transverse bearing pin 115 upon which is mounted a gear 117 which meshes with a gear 118 on the shaft 112. Connected with this gear 117 is a ratchet wheel 119. Loosely mounted on the hub of the ratchet wheel is a swinging arm 123. Pivotally connected with this arm near the lower end thereof is a link 124 which is adjustably connected at its left-hand end with an oscillating crank arm 125. The crank arm is secured to a transverse rock shaft 126 which carries at its rear end a lever 128. Carried by the lever at the upper end thereof is a roller positioned to be engaged by a cam 130 on a longitudinal rotatable shaft 131. Mounted on the swinging arm 123 is a pawl 133 adapted to engage the ratchet wheel 119. The shaft 131 is rotated in the manner to be presently described, and it will be seen that at each rotation thereof the arm 128 and the crank arm 125 are oscillated. By means of the link 124 the oscillation of the crank arm 125 is transmitted to the plate 123, the extent of oscillation of the plate being adjustable by changing the connection between the link and the crank arm. By means of the pawl 133 the ratchet wheel 119 is turned through a small angle, thus turning the shaft 112 and the lead screw 107 and moving the carriage.

The machine includes two alternately operable mechanisms, one for turning the spindle and reciprocating the tool for effecting relief, and the other for feeding the tool. These mechanisms are not herein shown or described in detail. It is desirable to feed the tool longitudinally while out of engagement with the blank, that is, when the tool is opposite the groove between two teeth of the blank. The blank is turned through approximately one revolution and is preferably mounted in the spindle so that at the position of stopping the tool will be opposite a groove. The grooves are helical but the spindle and the blank are supplementally turned at each longitudinal movement, this supplemental turning exactly compensating for the inclination of the grooves and insuring the stopping of the blank with a groove opposite the tool.

Preferably the former pin and the former are separated at the time of each longitudinal movement. In accordance with one feature of the invention the former and former pin are separated by moving toward the rear the one of them that is rearmost, the machine in this respect being different from that specifically claimed in my aforesaid application. When the pin is rearmost, as herein disclosed, the tool separation is effected by moving the pin rearward, the tool preferably also being similarly moved at the same time. This withdrawal of the former pin is effected by mechanism actuated by the shaft 131 which operates intermittently, the withdrawal being properly timed with respect to the feeding movements. Associated with the slide $24^a$ is an abutment $180^a$ which is engaged by the upper end of a lever $181^a$ longitudinally pivoted to the carriage 21. The lower end of the lever is provided with a roller which is adapted to be engaged by a cam plate $182^a$ on a cam disk $183^a$ secured to the shaft 131. At the beginning of the rotation of the shaft 131 the cam plate $182^a$ engages the roller on the lever $181^a$ and swings it in the clockwise direction, thus moving the abutment $180^a$ together with the slide $24^a$ toward the rear. The longitudinal feeding movements and the rearward movements of the pin and tool are so timed that the tool is always opposite a groove in the blank A when moved. This makes the rearward movement of the tool possible.

As the shaft 131 continues to rotate, the cam 130 operates the feeding mechanism in the way already described and the carriage is moved longitudinally along the bed. After that the cam plate $182^a$ permits the lever $181^a$ to return to the position shown and the slide $24^a$ moves forward, permitting the tool 25 and the former pin $27^a$ to return to their new operative positions. It will be seen that by thus withdrawing the former pin from the former at the time of longitudinal movement, I avoid any difficulties incident to forcing the former pin along the former while in contact therewith. If the former pin were maintained in contact with the former at all times difficulty would be experienced in effecting the longitudinal movement, particularly at places where the contour of the former is sharply inclined. For steep inclines such as herein illustrated, it would be impossible to thus move the former pin.

For returning the slide $24^a$ forward to its operative position a fluid controlled mechanism may be provided, such as fully described in my aforesaid copending application. In the drawings, however, I have shown a somewhat simpler mechanism which may be suitable for many classes of work. I have shown coil springs 205ᵃ which are located in transverse apertures 206ᵃ in the slide 24ᵃ. These springs abut at their rear ends against brackets 210 on the carriage 21 and abut at their front ends against plugs 223 fitted into the apertures.

The before mentioned abutment 180ᵃ is not connected directly to the slide 24ᵃ but is connected to a second slide 184ᵃ which is transversely movable independently of the first slide 24ᵃ. Springs 185ᵃ are interposed between the slide 184ᵃ and the carriage 21 and these springs tend to move the slide 184ᵃ forward, thus holding the abutment 180ᵃ at all times in engagement with the lever 181ᵃ.

Figure 4:
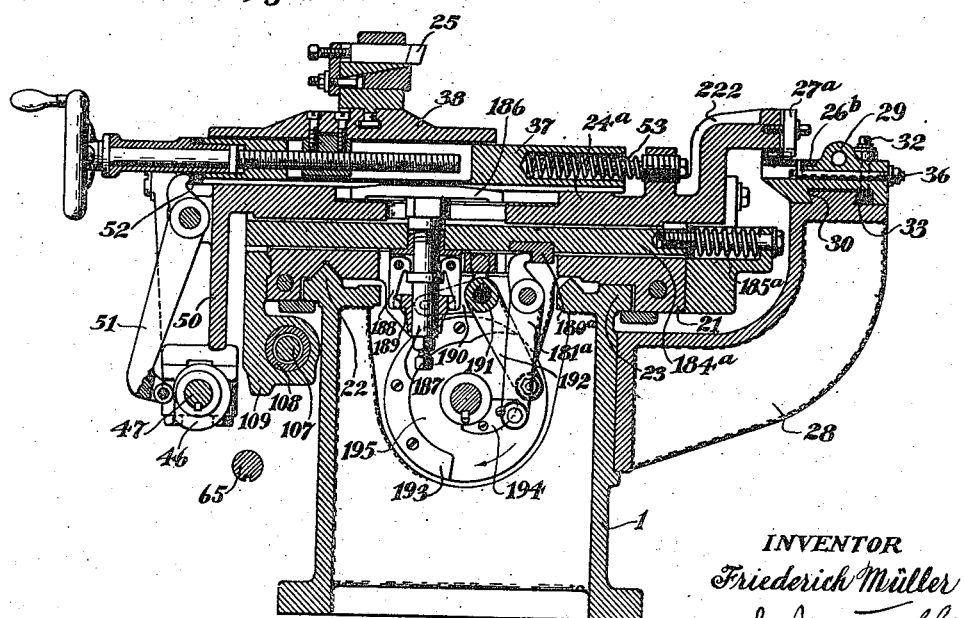
Fig. 4 is a sectional view of the machine taken along the line 4—4 of Fig. 1.

The two slides 24ᵃ and 184ᵃ are ordinarily connected by a lock. As shown most clearly in Fig. 4, the lock includes a plate 186 located in a recess in the top of the slide 24ᵃ. The plate is provided with a boss which projects downward through a slot in the slide, and threaded into this boss is a vertical stud 187. This stud extends through and closely fits an aperture in the slide 184ᵃ. Pivoted to the slide 184ᵃ are two small bell-crank levers 188, these levers having horizontal upper arms which engage a collar on the stud 187. The lower ends of the levers are adapted to be engaged by a tapered cam bushing 189 vertically movable on the stud. When the bushing 189 is in its lower position, as shown, the levers 188 are forced outward, thus drawing the stud 187 downward and forcing the plate 186 into clamping engagement with the slide 24ᵃ. In this way the slide 24ᵃ is firmly connected with the slide 184ᵃ. When the bushing 189 is in its raised position, the levers 188 swing inward, thus permitting the stud 187 to move upward and release the plate 186 from its clamping engagement with the slide 24. For moving the bushing 189 there is provided a forked lever 190 having projections engaging slots or notches in the bushing. This lever is secured to a longitudinal rock shaft 191 mounted in bearings in the carriage 21. Connected with the lever 190 is a lever 192 having a roller which is adapted to be engaged by cam plates 193 and 194 secured to a cam disk 195 mounted on the shaft 131. It will be seen that as the shaft 131 rotates, the cam plate 193 engages the roller on the lever 192, thus moving the lever 190 and the cam bushing 189 upward and releasing the lock. Subsequently the roller is engaged by the cam plate 194, thus moving the cam bushing 189 downward and re-engaging the lock.

I have already stated that a supplemental mechanism is provided for returning the slide 24ᵃ after it has been moved in the way before described. Preferably, in order that this supplemental returning mechanism may operate without being affected in any way by the return movement of the slide 184ᵃ, and in order further that the slide 24ᵃ may be returned with a minimum of effort, I provide a supplemental means for supporting the slide 24ᵃ after it has been unlocked from the slide 184ᵃ. As illustrated, the carriage 21 is provided near its front and rear with transverse pivot pins 196 and 197. The carriage is slotted adjacent the pins, and in these slots are positioned arms 198 and 199 respectively pivoted on the said pins. The arms are respectively provided with rollers 200 and 201 which are adapted to engage the bottom of the slide 24ᵃ. The arms are connected by pivoted links 202, and these links in turn are connected by a transverse yoke 203. The yoke 203 is provided with slots or notches in which fit pivot bosses projecting upward from the lever 190. The result is that when the lever 190 is swung upward to release the lock, the arms 198 and 199 are swung in a clockwise direction, thus swinging the rollers 200 and 201 upward so as to lift the slide 24ᵃ off from the slide 184ᵃ and support it independently. The actual raising of the slide may be but a few thousandths of an inch. For returning the slide 24ᵃ rearward as soon as it has been released by the lock and elevated by the rollers, there are provided coil springs 205ᵃ, as aforesaid.

It will be noted that the several cams 130, 182ᵃ, 193 and 194 are so positioned in relation to each other than the operations which they respectively control take place in the following order. First the two slides 184ᵃ and 24ᵃ are moved rearward in unison, they being still locked together. Then the slide 24ᵃ is unlocked from the slide 184ᵃ and is at the same time elevated on the rollers 200 and 201. At or about the same time the carriage is moved longitudinally to bring the former pin and the tool to new operative positions. Then the slide 184ᵃ is permitted to return forward to its normal position. In the meantime the slide 24ᵃ is being moved forward under the control of the springs 205ᵃ. After the completion of the said return movement of the slide 24ᵃ, the rollers 200 and 201 are lowered and the slide is again locked to the slide 184ᵃ.

It is believed that the method followed in the operation of the machine will be clear from the foregoing description and that a very brief summary will suffice. A former 26ᵃ is provided having a contour which is the reverse of the desired contour and a blank is put in place, this blank having been previously grooved and roughed out in any usual or preferred manner. The gear ing 78 is adjusted in accordance with the degree of inclination of the helical teeth on the blank and the gearing 56—57 is adjusted in accordance with the number of teeth on the blank. The tool is adjusted transversely and longitudinally into engagement with the blank at the right-hand end thereof. Then the machine is started, the sleeve 79 and the operating shaft 131 operating alternately in succession. During the rotative movement of the blank, relieving movements of the tool are effected as described, thus cutting the desired relief on the teeth of the blank. After one complete revolution of the blank the rotative movement of the spindle is stopped and also the relieving movements of the tool. The carriage is then fed longitudinally toward the left, the blank turning slightly in conformity with the helical teeth. Just prior to the longitudinal movement the tool slide, the former pin and tool are moved rearward, thus withdrawing the former pin from the former and moving the tool into a groove in the blank. After the longitudinal movement the tool slide is moved forward, thus returning the former pin to the former which is engaged at a new position. The tool assumes a corresponding position with respect to the blank. After this movement of the tool and former pin the blank is again rotated through one revolution and these movements are repeated alternately in succession until the blank is completely formed. It will be seen that with the step-by-step movements described and with a fine feed the former pin can follow or climb a very sharply inclined portion of the contour of the former, the tool being caused to cut a similarly inclined part of the contour of the cutter.

What I claim is:

1. The herein described method consisting in axially rotating a blank, in providing a cutting tool in position to engage the blank at the front thereof and cut it, in providing a former having a contour the reverse of that with which the blank is to be shaped, in providing a former pin connected with the tool and normally engaging the former at the rear thereof, and in effecting relative feeding movement between the pin and the former and between the tool and the work longitudinally of the latter, the former pin following the contour of the former and thus causing the tool to cut the said contour on the blank.

2. The herein described method consisting in axially rotating a blank, in providing a cutting tool in position to engage the blank at the front thereof and cut it, in providing a former having a contour the reverse of that with which the blank is to be shaped, in providing a former pin connected with the tool and normally engaging the former at the rear thereof, and in effecting relative intermittent feeding movements between the pin and the former and between the tool and the work longitudinally of the latter, the former pin following the contour of the former and thus causing the tool to cut the said contour on the blank.

3. The herein described method consisting in axially rotating a blank, in providing a cutting tool in position to engage the blank at the front thereof and cut it, in providing a former having a contour the reverse of that with which the blank is to be shaped, in providing a former pin connected with the tool and normally engaging the former at the rear thereof, in effecting relative intermittent feeding movements between the pin and the former and between the tool and the work longitudinally of the latter, the former pin following the contour of the former and thus causing the tool to cut the said contour on the blank, and in separating the pin and the former at the time of each feeding movement and returning them to engagement after each longitudinal movement.

4. The herein described method consisting in axially rotating a blank, in providing a cutting tool in position to engage the blank at the front thereof and cut it, in providing a former having a contour the reverse of that with which the blank is to be shaped, in providing a former pin connected with the tool and normally engaging the former at the rear thereof, in effecting relative intermittent feeding movements between the pin and the former and between the tool and the work longitudinally of the latter, the former pin following the contour of the former and thus causing the tool to cut the said contour on the blank, and in withdrawing the pin rearward from the former at the time of each feeding movement and returning the pin to engagement with the former after each longitudinal movement.

5. The herein described method consisting in axially rotating a blank having generally longitudinal grooves therein, in providing a cutting tool in position to engage the blank at the front thereof and cut it, in providing a former having a contour the reverse of that with which the blank is to be shaped, in providing a former pin connected with the tool and normally engaging the former at the rear thereof, in effecting relative intermittent feeding movements between the pin and the former and between the tool and the work longitudinally of the latter and in timed relation to the blank rotation so that each movement takes place with the tool opposite a groove, the former pin following the contour of the former and thus causing the tool to cut the said contour on the blank, and in withdrawing the pin rearward from the former and moving the tool rearward into the groove at the time of each longitudinal movement and returning the pin to engagement with the former and correspondingly returning the tool after each such movement.

6. The herein described method consisting in axially rotating a blank having generally longitudinal grooves therein, in providing a cutting tool in position to engage the blank at the front thereof and cut it, in providing a former having a contour the reverse of that with which the blank is to be shaped, in providing a former pin connected with the tool and normally engaging the former at the rear thereof, in effecting relative intermittent feeding movements between the pin and the former and between the tool and the work longitudinally of the latter and in timed relation to the blank rotation so that each movement takes place with the tool opposite a groove, the former pin following the contour of the former and thus causing the tool to cut the said contour on the blank, in stopping the blank rotation at the time of each longitudinal movement, and in withdrawing the pin rearward from the former and moving the tool rearward into the groove at the time of each longitudinal movement and returning the pin to engagement with the former and correspondingly returning the tool after each such movement.

7. The herein described method consisting in axially rotating a blank having generally longitudinal helical grooves therein, in providing a cutting tool in position to engage the blank at the front thereof and cut it, in providing a former having a contour the reverse of that with which the blank is to be shaped, in providing a former pin connected with the tool and normally engaging the former at the rear thereof, in effecting relative intermittent feeding movements between the pin and the former and between the tool and the work longitudinally of the latter and in timed relation to the blank rotation so that each of the several successive movements takes place with the tool opposite one of the helical grooves, the former pin following the contour of the former and thus causing the tool to cut the said contour on the blank, and in withdrawing the pin rearward from the former and moving the tool rearward into the groove at the time of each longitudinal movement and returning the pin to engagement with the former and correspondingly returning the tool after each such movement.

8. The herein described method which consists in rotating a blank, in providing a cutting tool in position to engage the blank, in providing a former having a contour the reverse of that to which the blank is to be shaped, in providing a former pin connected with the tool and normally engaging the former, in effecting relative intermittent feeding movements between the blank and the tool, in moving the tool toward and the former pin away from the former member prior to each feeding movement, and in returning the former pin into engagement with the former member after each feeding movement.

In testimony whereof, I hereto affix my signature.

FRIEDERICH MÜLLER.